United States Patent
Sugiyama (10) Patent No.: US 9,208,412 B2
(45) Date of Patent: Dec. 8, 2015

(54) SETTING CHANGE CONTROL FOR AN IMAGE FORMING SYSTEM AND IMAGE FORMING APPARATUS

(71) Applicant: Takashi Sugiyama, Okazaki (JP)

(72) Inventor: Takashi Sugiyama, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/171,713

(22) Filed: Feb. 3, 2014

(65) Prior Publication Data

US 2014/0153048 A1 Jun. 5, 2014

Related U.S. Application Data

(63) Continuation of application No. 12/399,252, filed on Mar. 6, 2009.

(30) Foreign Application Priority Data

Apr. 28, 2008 (JP) ................................. 2008-117621

(51) Int. Cl.
*G06F 3/12* (2006.01)
*G06K 15/02* (2006.01)
(52) U.S. Cl.
CPC .......... *G06K 15/1806* (2013.01); *G06F 3/1203* (2013.01); *G06F 3/1239* (2013.01); *G06F 3/1258* (2013.01)
(58) Field of Classification Search
CPC ... G06F 3/1203; G06F 3/1258; G06F 3/1239; G06K 15/1806

USPC ................. 358/1.13, 1.14, 1.15; 399/8, 79; 709/225

See application file for complete search history.

(56) References Cited

U.S. PATENT DOCUMENTS

| 6,006,045 | A | 12/1999 | Miyawaki |
| 6,202,092 | B1 | 3/2001 | Takimoto |
| 6,985,244 | B1 * | 1/2006 | Bhogal et al. ................ 358/1.15 |
| 2005/0050247 | A1 | 3/2005 | McClelland et al. |
| 2005/0219612 | A1 | 10/2005 | Nakagawa |
| 2005/0275867 | A1 | 12/2005 | Higashiura et al. |
| 2005/0275868 | A1 * | 12/2005 | Higashiura et al. .......... 358/1.14 |
| 2006/0055974 | A1 | 3/2006 | Yamaguchi |
| 2006/0256357 | A1 | 11/2006 | Hochwender et al. |

(Continued)

FOREIGN PATENT DOCUMENTS

EP 0809176 A2 11/1997
JP 11-024517 1/1999

(Continued)

OTHER PUBLICATIONS

Office Action received in related European Application No. 09 003 689.8, dated Feb. 14, 2014.

(Continued)

*Primary Examiner* — David S Cammack
(74) *Attorney, Agent, or Firm* — Banner & Witcoff, Ltd.

(57) ABSTRACT

Setting change for an image forming device may include determining whether the image forming device is currently performing print processing. In some examples, if the image forming device is currently performing print processing, the setting change may be delayed. In other examples, the setting change may be implemented irrespective of the print processing. In one arrangement, the setting change may be specific to a particular entity (e.g., a user).

19 Claims, 8 Drawing Sheets

(56) References Cited

U.S. PATENT DOCUMENTS

| | | |
|---|---|---|
| 2007/0091353 A1 | 4/2007 | Yamada |
| 2007/0103711 A1 | 5/2007 | Funakawa |
| 2007/0115493 A1 | 5/2007 | Haginaka et al. |
| 2007/0172281 A1 | 7/2007 | Inoue et al. |
| 2007/0229874 A1* | 10/2007 | Hamada ................ 358/1.14 |
| 2008/0137134 A1* | 6/2008 | Igarashi ................ 358/1.15 |
| 2008/0246993 A1* | 10/2008 | Murakami et al. ......... 358/1.15 |

FOREIGN PATENT DOCUMENTS

| | | | | |
|---|---|---|---|---|
| JP | 2001156957 A | * | 6/2001 | ............ H04N 1/00 |
| JP | 2005349704 A | | 12/2005 | |
| JP | 2007118244 A | | 5/2007 | |
| JP | 2007133494 A | | 5/2007 | |
| JP | 2007133778 A | | 5/2007 | |
| JP | 2007140909 A | | 6/2007 | |

OTHER PUBLICATIONS

EP Office Action dated Sep. 7, 2011, EP Application No. 09 003 689.8.

CN Office Action dtd Oct. 9, 2010, CN Appln. 200910133034.7, English translation.

Jan. 20, 2015—(CN) Notification of First Office Action—App 201210535363.6.

Oct. 10, 2015 (CN Notification of the Second Office Action—App 201210535363.6.

* cited by examiner

| USER | SETTING INFORMATION | | |
| --- | --- | --- | --- |
| | PRINTING AVAILABILITY | COLOR PRINTING AVAILABILITY | UPPER LIMIT IN PRINTABLE NUMBER OF SHEETS |
| USER A (ADMINISTRATOR) | ○ | ○ | 1,000 |
| USER B | ○ | × | 1,500 |
| USER C | × | × | — |
| ⋮ | ⋮ | ⋮ | ⋮ |

SETTING CHANGE CONTROL FOR AN IMAGE FORMING SYSTEM AND IMAGE FORMING APPARATUS

CROSS-REFERENCE TO RELATED APPLICATIONS

This application is a continuation of U.S. patent application Ser. No. 12/399,252 filed Mar. 6, 2009, which claims priority from Japanese Patent Application No. 2008-117621 filed on Apr. 28, 2008. The entire subject matter of the above noted applications is incorporated herein by reference.

TECHNICAL FIELD

The invention relates to an image forming system, an image forming apparatus and a restriction changing program.

BACKGROUND

There has been proposed a related art image forming system including a printing restriction function. The printing restriction function is a function of setting a restriction on a print process, for example, a feature that restricts the number of sheets which can be printed within a predetermined period of time. As an example of the related art image forming system, JP-A-11-24517 discloses a system that can change setting information of a printing restriction based on a change request by an administrator.

SUMMARY

However, the related art image forming systems are silent in a case where processing of a print job competes against a change request of the printing restriction.

Therefore, illustrative aspects of the invention provide an image forming system, an image forming apparatus and a restriction changing program, which are capable of coping with a case where processing of a print job competes against a change request of a printing restriction.

According to one aspect of the invention, there is provided an image forming system comprising: an information processing unit; an image forming apparatus that communicates with the information processing unit; a first memory unit that stores setting information of printing restriction on the image forming apparatus; a printing unit that executes a printing process of a print job in accordance with the setting information; a detection unit that detects a change request of the setting information; a job judging unit that judges whether there exists a print job in processing when the detection unit detects the change request; and a first permitting unit that permits change of the setting information in accordance with the change request when the job judging unit judges that there exists no print job in processing.

According thereto, when a change request of the setting information of a printing restriction is detected, it is judged whether there is a print job in progress of processing, and if it is judged that there exists no print job, changing of the setting information is permitted. Therefore, the invention can cope with a case where the change request competes against processing of a print job.

According to another aspect of the invention, there is provided an image forming apparatus comprising: a memory unit that stores setting information of printing restriction; a printing unit that executes a print process of a print job in accordance with the setting information; a detection unit that detects a change request of the setting information; a job judging unit that judges whether there exists a print job in processing when the detection unit detects the change request; and a permitting unit that permits change of the setting information in accordance with the change request when the job judging unit judges that there exists no print job in processing.

According to still another aspect of the invention, there is provided a computer-readable medium having a restriction changing program stored thereon and readable by a computer, the computer being provided in an image forming apparatus that comprises a memory unit that stores setting information of a printing restriction, the restriction changing program, when executed by the computer, causes the computer to perform operations comprising: a restriction process for restricting print processing of the image forming apparatus in accordance with the setting information; a detection process for detecting a change request of the setting information; a job judging process for judging whether there exists a print job in processing when the change request is detected by the detection process; and a permitting process for permitting change of the setting information in accordance with the change request when the job judging process judges that there exists no print job in processing.

According to the aspects of the invention, it is possible to deal with a case where processing of a print job competes against a change request of a printing restriction.

DETAILED DESCRIPTION

Figure 1:
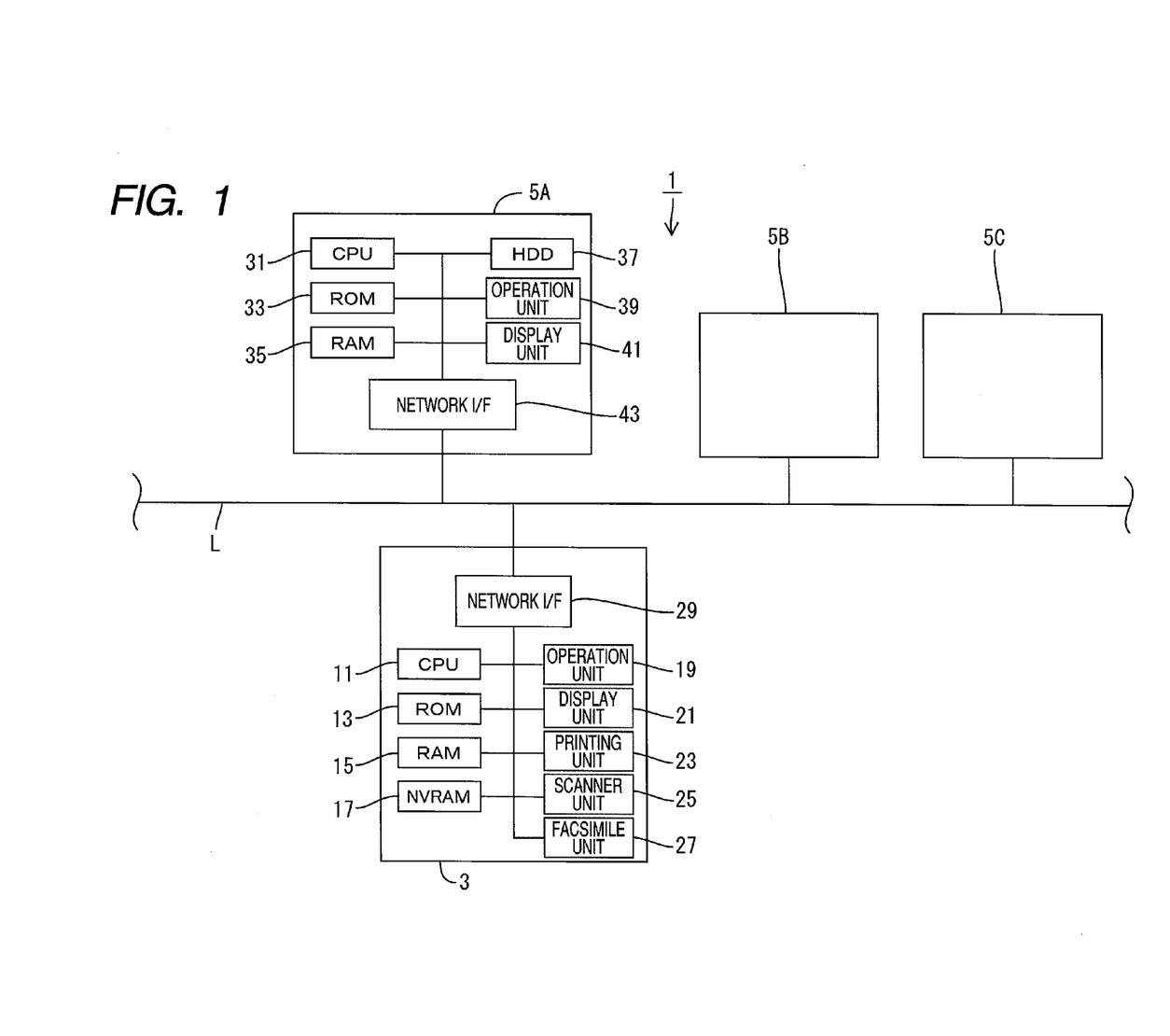
FIG. 1 is a block diagram showing an electrical configuration of an image forming system according to a first exemplary embodiment of the invention.

Exemplary embodiments of the invention will now be described with reference to the drawings.
(First Exemplary Embodiment)
Referring to FIGS. 1 though 6, a first exemplary embodiment of the invention will be described.
(Image Forming System)
FIG. 1 is a block diagram showing an electrical configuration of an image forming system 1. The image forming system 1 includes an image forming apparatus 3 and a plurality of (i.e., three in FIG. 1) computers 5 (one example of an information processing apparatus) are connected with each other via a communication line L. One of the plurality of computers 5 is a computer 5A of a user having an administration authority, and other computers 5B and 5C are computers of users having no administration authority. Hereinafter, the user of the computer 5A is called "user A" or "administrator A," a user of the computer 5B is called "user B," and a user of the computer 5C is called "user C." Since the basic configuration of respective computers 5 is the same, FIG. 1 shows the configuration of the computer 5A, and the configuration of the other computers 5B and 5C is omitted.

(1) Image Forming Apparatus

The image forming apparatus 3 is, for example, a multifunction device having a printing function, a copying function, a facsimile function, etc. The image forming apparatus 3 includes a CPU 11, a ROM 13, a RAM 15, a NVRAM 17 (Non-volatile memory), an operation unit 19, a display unit 21, a printing unit 23, a scanner unit 25, a facsimile unit 27, and a network interface 29, etc.

The ROM 13 stores programs for controlling basic actions of the image forming apparatus 3, a printing restriction program and a restriction changing program (which will be described later). The CPU 11 controls the image forming apparatus 3 in accordance with the programs read from the ROM 13 while storing the processing results in the RAM 15 and the NVRAM 17.

The operation unit 19 includes a plurality of buttons. The operation unit 19 enables various types of inputting operations such as a printing request, a copying request, etc., by a user. The display unit 21 includes a liquid crystal display and lamps. The display unit 21 can display various types of setting screens and operation states. The printing unit 23 executes printing on sheets based on printing data of an object to be printed. The scanner unit 25 generates printing data by reading an image of a document placed on a document table (not illustrated) of the image forming apparatus 3. The facsimile unit 27 executes transmission of facsimile data to and receiving thereof from other facsimile apparatuses via a telephone line (not illustrated). The network interface 29 is connected to a computer 5, etc., via the communication line L so as to enable data transmission between the image forming apparatus 3 and the computer 5, etc.

(2) Computer

The respective computers 5 have the same configuration, and each of the computers 5 includes a CPU 31, a ROM 33, a RAM 35, a hard disk 37, an operation unit 39, a display unit 41, and a network interface 43, etc. The hard disk 37 stores various types of programs such as application software to prepare printing data and a printer driver. The operation unit 39 includes a keyboard and a pointing device. The display unit 41 includes, for example, a liquid crystal display, etc. The network interface 43 is connected to the communication line L.

(Printing Restriction Function)

(1) Printing Restriction Function

The image forming system 1 has a printing restriction function that can set restrictions on a print processing of the printing unit 23. Items that may be subjected to a printing restriction in the first exemplary embodiment (hereinafter merely called "restriction items") are as follows.

(A) Printing Availability: Item for setting availability of printing processing.

(B) Color Printing Availability: Item for setting availability of color printing.

(C) Upper-limit in Printable Number of Sheets: Item for setting an upper limit in total number of sheets printable for a predetermined period of time (for example, a day).

Incidentally, the printing availability, the color printing availability and the upper-limit in printable number of sheets can be set for the respective functions such as a printing function, a copying function, a facsimile function, etc.

Figure 2:
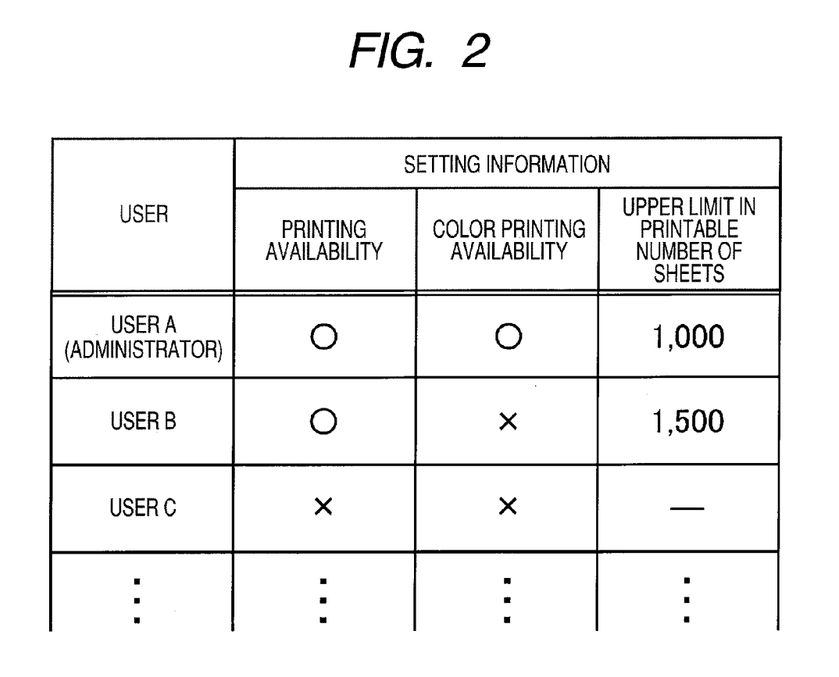
FIG. 2 is a schematic view showing data structure in a first memory area.

The NVRAM 17 stores setting information of a printing restriction including respective set values of the above-described three restriction items in a first memory area (one example of a first memory unit and a memory unit) of the NVRAM 17. In the first exemplary embodiment, the set information including the printing restriction may be set for the respective users. The first memory area of the NVRAM 17 stores respective setting information associated with users (i.e., user identification number) as shown in FIG. 2.

(2) Printing Restriction Processing

When respective users want to execute so-called PC printing that causes the image forming apparatus 3 to print data stored in their own computer 5, for example, the respective users input their own user identification number and password by operating the operation unit 39 of their own computer 5. Then, the CPU 31 of the computer 5 transmits the user identification number and password to the image forming apparatus 3. In association therewith, the CPU 11 of the image forming apparatus 3 acquires data of the user identification number and password and executes authentication of the user based on the memory content of the NVRAM 17, etc,. When the authentication of the user is succeeded, the CPU 11 executes printing restriction processing (one example of a restriction processing) shown in FIG. 3. Incidentally, since the password is used for authentication of the users, the authentication of users may be made only by the user identification number without using the password.

Figure 3:
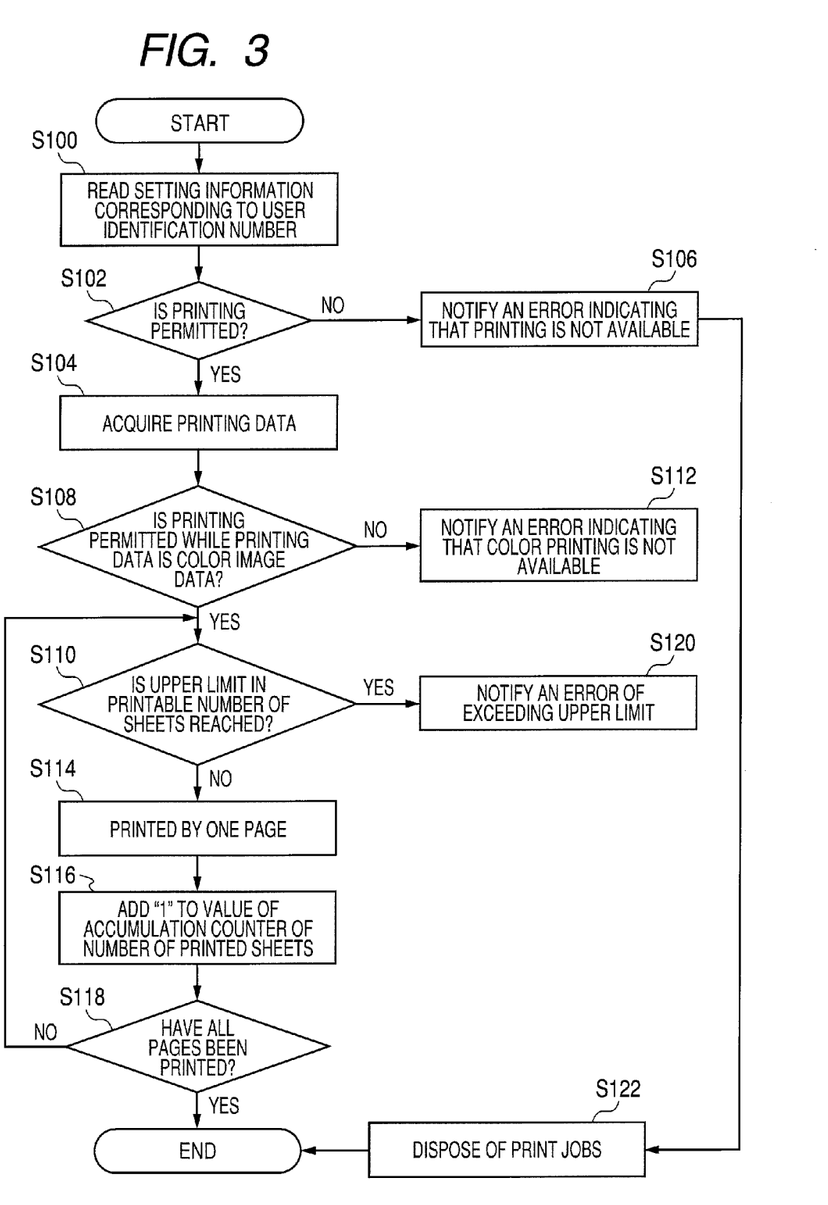
FIG. 3 is a flowchart showing a printing restriction process.

The CPU 11 reads setting information associated with the user identification number, which is received from the computer 5, from the first memory area in S100. The CPU 11 judges printing availability based on the set value of printing availability, which is included in the setting information, in S102. According to the setting information shown in FIG. 2, if the received user identification number is user A's or user B's (S102: YES), the CPU 11 judges that printing is available, and the process goes to S104. In contrast, if the received identification number is user C's, the CPU 11 judges that printing is not available (S102: NO) and informs the computer 5C of an error indicating that printing is not available via the communication line L (S106). The CPU 31 of the computer 5C controls the display unit 41 to display a message, etc., indicating that printing is not available in order to notify the user C that printing is not available.

When the CPU 11 judges that printing is available (S102: YES), the CPU 11 informs the computer 5A (5B) of printing being available. Then, if a user A (B) requests printing in the computer 5A (5B), the CPU 11 acquires printing data corresponding to the printing request from the computer 5A (5B) (S104), and registers the print job associated with the printing data in a waiting matrix (queue) (not illustrated).

In S108, the CPU 11 judges color printing availability based on the set value of color printing availability included in the setting information. That is, it is first judged whether the received printing data is color image data. Here, if the received printing data is color image data, the CPU 11 judges whether a user who requests printing (i.e., a user having the received user identification number) is set to be available to execute color printing.

According to the setting information shown in FIG. 2, if the user who requests printing is user A, it is judged that printing is available (S108: YES), and the process goes to S110. In contrast, if the user is user B, it is judged that printing is not available (S108: NO), and an error indicating that color printing is not available is notified to the computer 5B via the communication line L. The CPU 31 of the computer 5B controls the display unit 41 to display a message, etc., indicating that the color printing is not available in order to notify the user B that color printing is not available. Incidentally, if the printing data is single-color (for example, monochrome) image data, the judgment in S108 becomes YES, and the process goes to S110.

When the CPU 11 judges that color printing is available (S108: YES), the CPU 11 further judges the upper-limit of printable number of sheets based on the set value of the upper limit in the number of sheets, which is included in the setting information, in S110. In S110, it is judged whether the current accumulated number of printed sheets per user reaches the upper limit in the number of sheets for respective users. When the current accumulated number of printed sheets is less than the upper limit in the number of sheets (S110: NO), the printing unit 23 prints the printing data for one page in S114, and "1" is added to the value of the accumulation counter of the number of printed sheets in S116. When all pages in regard to a print job of the printing data are not printed (S118: NO), the process returns to S110. When all pages of the print job are printed (S118: YES), the printing restriction processing is terminated.

In contrast, when the accumulated number of printed sheets reaches the upper limit in the number of sheets (S110: YES), the CPU 11 controls the printing unit 23 to stop printing and informs the computer 5 of an error of exceeding the upper limit in the number of sheets via the communication line L in S120. For example, if the user who requests printing is user A, and the accumulated number of printed sheets for the user A reaches 1000 sheets, the CPU 31 of the computer 5A controls the display unit 41 to display a message, etc., of the error of exceeding the upper limit in the number of sheets so as to notify the user A that the number of sheets exceeds the upper limit.

Further, when it is judged that print processing is not available in judgment of printing availability, color printing availability, and the upper limit in printable number of sheets (S102: NO, S108: NO, and S110: YES), the print job is deleted from the waiting matrix (queue) in S122. Thus, the print job is eliminated from the objects to be printed. Incidentally, the CPU 31 functions as an "elimination unit" in S122. That is, the print job, for which print processing becomes unavailable by a printing restriction, is eliminated from the objects to be printed. Therefore, it is possible to prevent a state, in which print processing of succeeding print jobs is stopped, from being continued.

Incidentally, when a document on the document table (not illustrated) is copied or received facsimile data is outputted by printing, the CPU 11 of the image forming apparatus 3 executes the above-described printing restriction process if a user inputs the user identification number and password by using the operation unit 19 of the image forming apparatus 3. In this case, messages (S106, S112 and S120) of the above-described respective errors are displayed on the display unit 21 of the image forming apparatus 3.

(Process of Change of Printing Restriction)

The image forming system 1 is configured to change the setting information of the printing restriction. In addition, the image forming system 1 can individually change the setting information of respective users. Hereinafter, change of the setting information of a printing restriction is merely called "change of printing restriction." In order to execute the change of printing restriction, for example, an administrator A makes a request of the change of printing restriction by an inputting operation in his own computer 5A (hereinafter merely called a "change request").

Incidentally, in the first exemplary embodiment, it is possible to execute the above-described change request regardless of whether a print job in process exists (i.e., a print job in progress of print processing in the first exemplary embodiment). Therefore, the print processing of a print job may compete against a change request of the printing restriction. In order to cope with such a situation, according to the first exemplary embodiment, the above-described restriction changing program is installed to the image forming apparatus 3.

Figure 4:
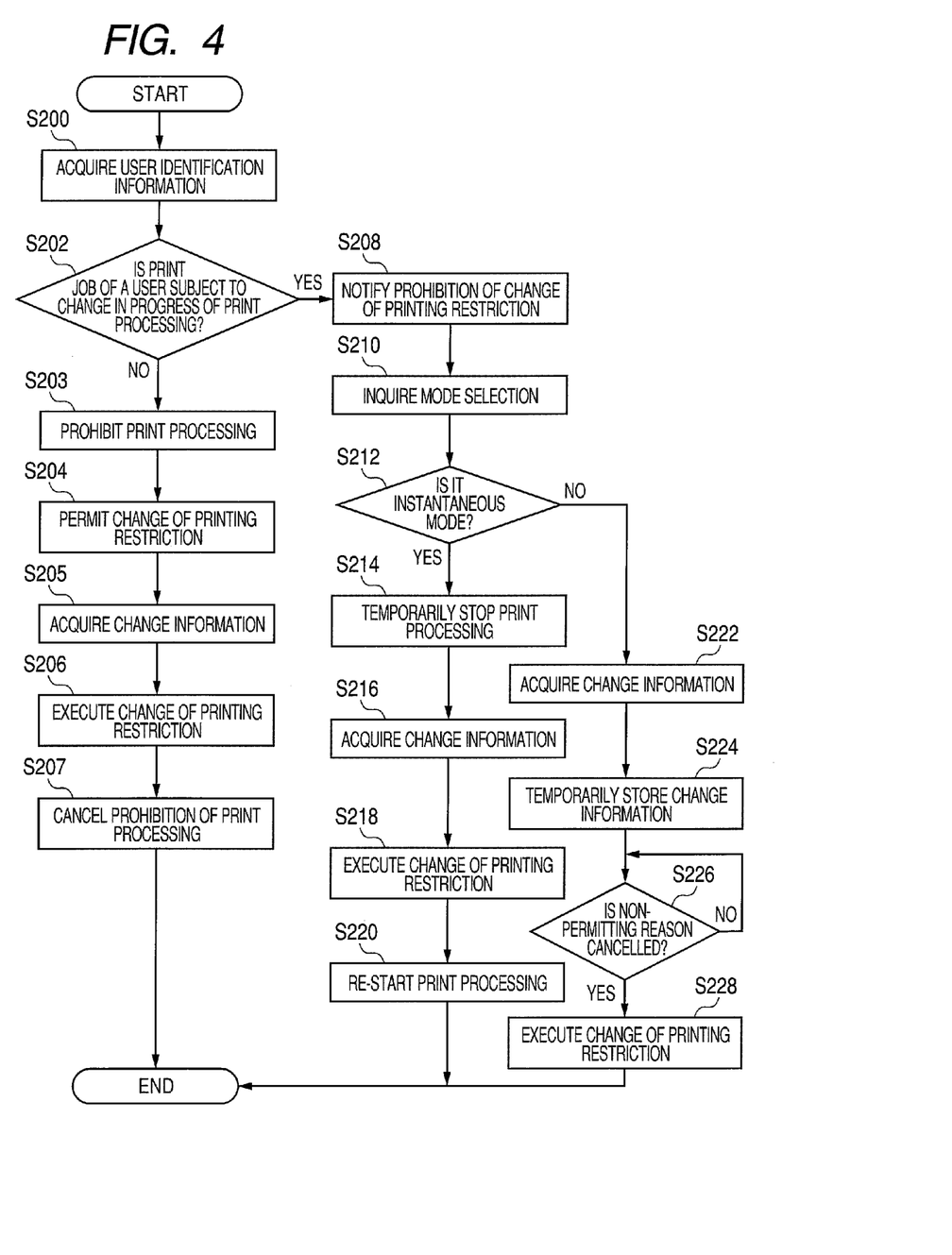
FIG. 4 is a flowchart showing a printing restriction change process.

When the CPU 11 of the image forming apparatus 3 detects receiving of a command of commencing the above-described change request from the computer 5A (one example of a detection process), a process of change of printing restriction shown in FIG. 4 is executed based on the restriction changing program. At this time, the CPU 11 functions as the detection unit in the invention. Then, when the administrator A inputs, in the computer 5A, a user identification number of a user (a user subject to change) corresponding to the setting information that the administrator A wants to change the restriction, the CPU 11 acquires the user identification number via the communication line L in S200. Incidentally, the CPU 11 may be configured to detect receipt of a command of commencing a change request upon receiving of the user identification information.

(1) Judgment of Job Processing Status

Judgment of job processing status is executed in S202 (one example of a job judging process). In the judgment of job processing status, it is judged whether there exists a print job during print processing at present, in other words, whether the printing unit 23 is executing print processing. If there is no print job during print processing in S202, change of printing restriction is permitted (S202: NO), and the process goes to S203 (one example of a permitting process). At this time, the CPU 11 functions as a job judging unit, a first permitting unit and a permitting unit.

In contrast, if the print job in progress of print processing exists in S202, it is judged whether the user of the print job in progress of print processing is coincident with the user subject to change. At this time, the CPU 11 functions as a user judging unit. If the users are not coincident with each other, the change of printing restriction is permitted (S202: NO), and the process goes to S203. That is, in the first exemplary embodiment, even when a print job in progress of print processing exists, the change of printing restriction is permitted so long as the user of the print job is not coincident with a user subject to change.

After it is judged that the change of printing restriction is permitted in S203, the process goes to S204. In S204, the print processing of the printing unit 23 is prohibited. At this time, the CPU 11 functions as a prohibition unit. Therefore, a print job is prevented from being brought in print processing, and a state in which change of printing restriction is permitted is maintained. Therefore, the administrator A can execute, with sufficient time, an input operation of change information (i.e., information including respective set values of the three restriction items, in which the set value of at least one of the restriction items differs from the current setting information) of the printing restriction shown below. When the administrator A inputs the change information in the computer 5A, the CPU 11 of the image forming apparatus 3 acquires the data of the change information via the communication line L (S205). In S206, the setting information of the printing restriction stored in the first memory area of the NVRAM 17 is changed to the change information, and in S207, the prohibition state of the print processing is cancelled, and the change of printing restriction process is terminated. Therefore, the printing restriction is validated by the changed setting information stored in the first memory area.

(2) Instantaneous Mode and Reservation Mode

In contrast, if the user of the print job in progress of print processing is coincident with a user subject to change (S202: YES), the change of printing restriction is prohibited, and prohibition of the change of printing restriction is notified to the computer 5A in S208. Then, in S210, the computer 5A is instructed to make an inquiry about which one of the instantaneous mode or the reservation mode is selected. Then, the CPU 31 of the computer 5A controls the display unit 41 to display the content of the inquiry so as the administrator A to select any one of the instantaneous mode and the reservation mode. The selection result is returned to the image forming apparatus 3.

If the CPU 11 of the image forming apparatus 3 judges that the instantaneous mode has been selected based on the selection result (S212: YES), the instantaneous mode, in which the change of printing restriction can be instantaneously executed, is executed. At this time, the CPU 11 functions as a selection unit and a controller. That is, the print processing that is executed at present is forcibly stopped temporarily (S214), and the change of printing restriction is enabled. At this time, the CPU 11 functions as a second permitting unit. Additionally, since the administrator A can execute an input operation of the change information with sufficient time under temporary stop, the CPU 11 may also function as a prohibition unit in a broad meaning. When the administrator A inputs the change information of a printing restriction in the computer 5A in the permitted state, the CPU 11 of the image forming apparatus acquires the data of the change information via the communication line L (S216), and the setting information of the printing restriction is changed to the change information in S218.

Then, the print processing is re-started in S220, and the process of the change of printing restriction is terminated. Thus, in the instantaneous mode, it is possible to execute change of printing restriction even in progress of print processing of a print job. Incidentally, in S220, either of a configuration in which the print processing of the temporarily stopped print job is re-started from the remaining portion of the print processing or a configuration in which the print processing of the temporarily stopped print job is re-started from the beginning thereof may be adopted.

If the CPU 11 of the image forming apparatus 3 judges that the reservation mode has been selected based on the selection result in S212 (S212: NO), the CPU 11 executes the reservation mode. At this time, the CPU 11 functions as a selection unit and a controller. In the reservation mode, execution of the change of printing restriction based on the change information is reserved while inputting of the change information of the printing restriction is enabled, and the change of printing restriction is automatically executed after the present print processing is finished. That is, it is possible to input setting information of printing restriction with the under-execution current print processing continued. If, in the input-enabled state, the administrator A inputs change information of the printing restriction in the computer 5A, the CPU 11 of the image forming apparatus 3 acquires the data of the change information via the communication line L (S222). Then, the CPU temporarily stores the acquired change information of printing restriction (S224) in, for example, the second memory area (one example of a second memory unit) of the NVRAM 17.

Then, in S226, it is judged whether the non-permitting reason of the change of printing restriction in the judgment of job processing state is removed. That is, it is judged whether the print processing of a print job which is under execution is finished. When the print processing has been finished (S226: YES), the setting information of the printing restriction is changed to the change information stored in the second memory area in S228. At this time, the CPU 11 functions as a change unit. If such a reservation mode is executed, the change information reflected in the setting information of printing restriction is reserved while enabling input of the change information. Therefore, it is possible to prevent the print processing of a print job, which is under execution at present, from being influenced by execution of the change of printing restriction.

In addition, a change request may be made by the administrator A executing an input operation at the operation unit 19 of the image forming apparatus 3. In this case, information regarding the change of printing restriction prohibition (S208) and an inquiry about mode selection (S210) is displayed on the display unit 21 of the image forming apparatus 3, and input of change information and mode selection are executed by the operation unit 19.

(3) Example of Change of Printing Restriction

Figure 5:
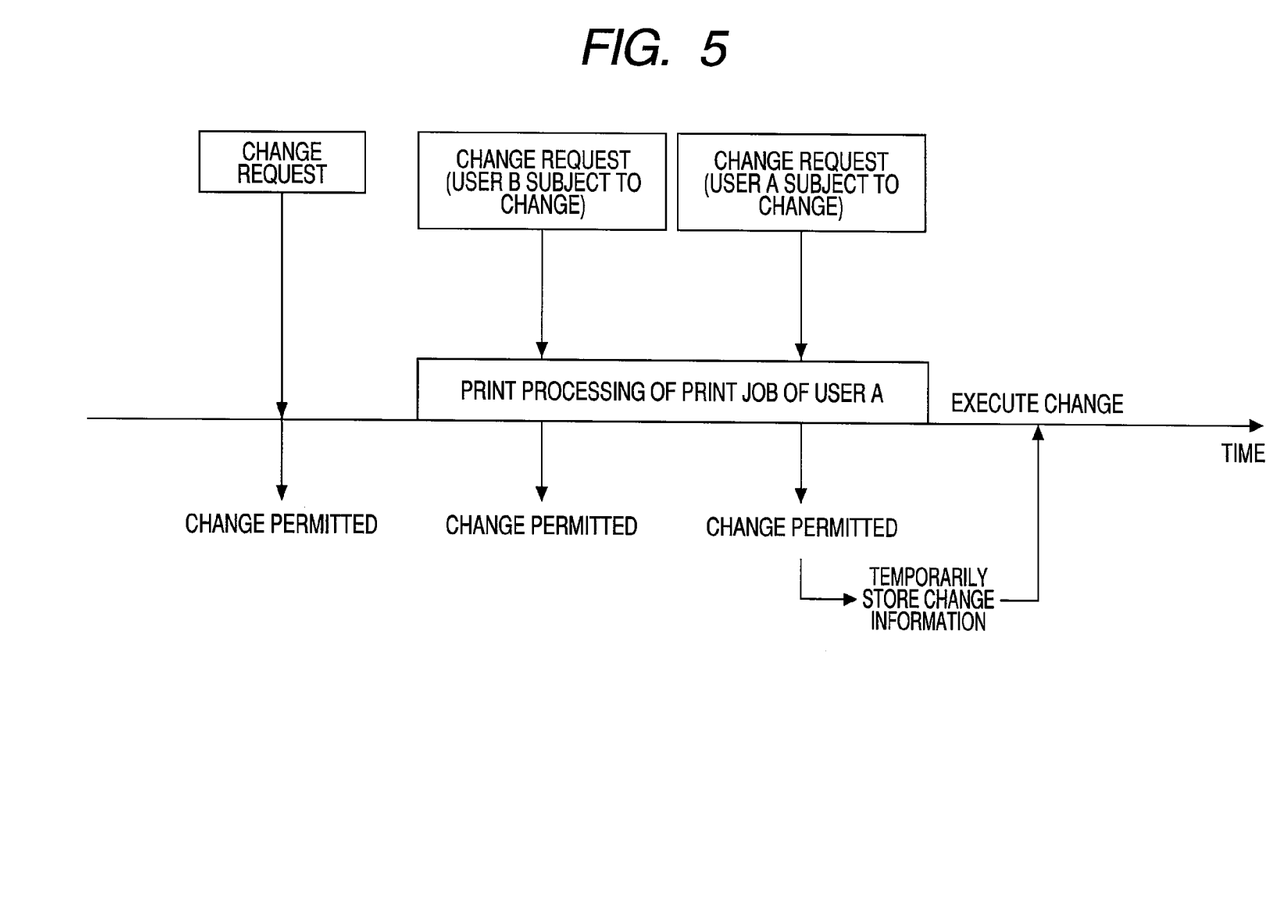
FIG. 5 is a timing chart (Reservation mode) showing the relationship between various types of change requests and print processing.
Figure 6:
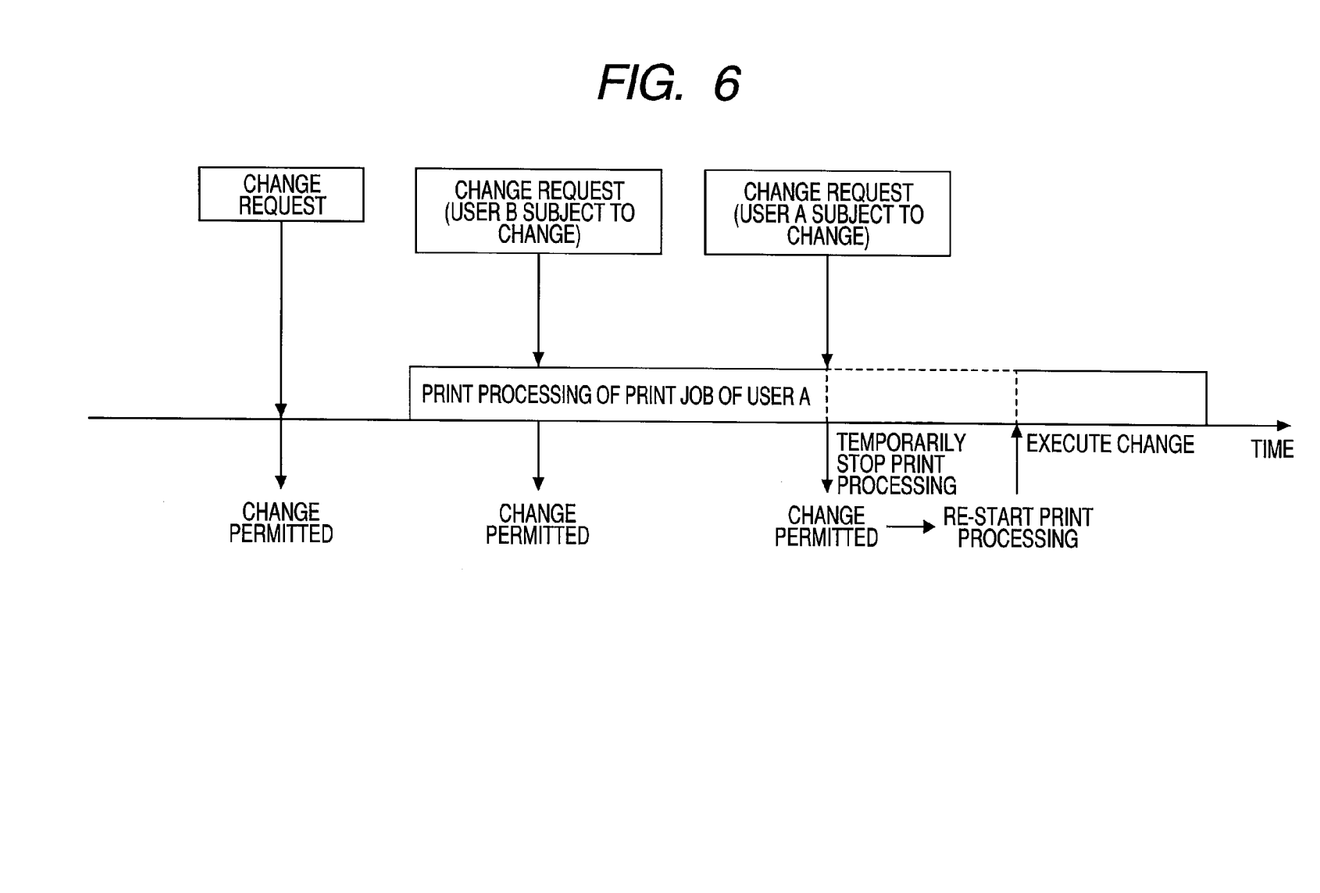
FIG. 6 is a timing chart (Instantaneous mode) showing the relationship between various types of change requests and print processing.

FIG. 5 and FIG. 6 are timing charts each showing the relationship between various types of change requests and print processing. When the administrator A makes a change request where the printing unit 23 is not in progress of print processing, the change of printing restriction is permitted whoever the user subject to change is (S202: NO). Further, for example, if the user subject to change is user B where the print job of the administrator A (user A) is in progress of print processing, the change of printing restriction is permitted as well (S202: NO). This is because, even if the setting information of the user B is changed, no influence is given to the print processing of the user A.

In contrast, when the administrator A makes a change request in which the user subject to change is the administrator A, the change request is judged to be corresponded to a non-permitting reason of the user subject to change being coincident with the user of a print job in progress of print processing at present, and thus the change of printing restriction is not permitted (S202: YES). Here, if the administrator A selects the reservation mode (S212: NO), input of change information for the administrator A is permitted with the current print processing continued as shown in FIG. 5, and the change information is temporarily stored in the image forming apparatus 3. When the print processing is finished, the non-permitting reason is removed, and the change information is reflected in the setting information of a printing restriction.

If the administrator A selects the instantaneous mode (S212: YES), the print processing of a print job of the user A is temporarily stopped as shown in FIG. 6, and the change of printing restriction is permitted. The print processing is re-started as soon as the change of printing restriction is executed.

Accordingly, if the administrator A wants to continue the print processing of his own print job, the administrator A selects the reservation mode. In contrast, if the administrator A considers that the print processing may be temporarily stopped because of his own print job, the administrator A may select the instantaneous mode.

According to the first exemplary embodiment, when a change request is detected, it is judged whether there exists a print job in progress of print processing. If it is judged that there is no print job, the change of printing restriction is permitted. Therefore, even when the change request competes against the print processing of a print job, smooth processing can be executed.

Further, even when there exists a print job in progress of print processing, the change of printing restriction is permitted so long as the user of a print job in progress of print processing is not coincident with the user subject to change. Therefore, if there exists a print job during print processing, permissible range of the change of printing restriction can be further widened than in a configuration in which the change of printing restriction is uniformly prohibited regardless of user.

(Second Exemplary Embodiment)

Figure 7:
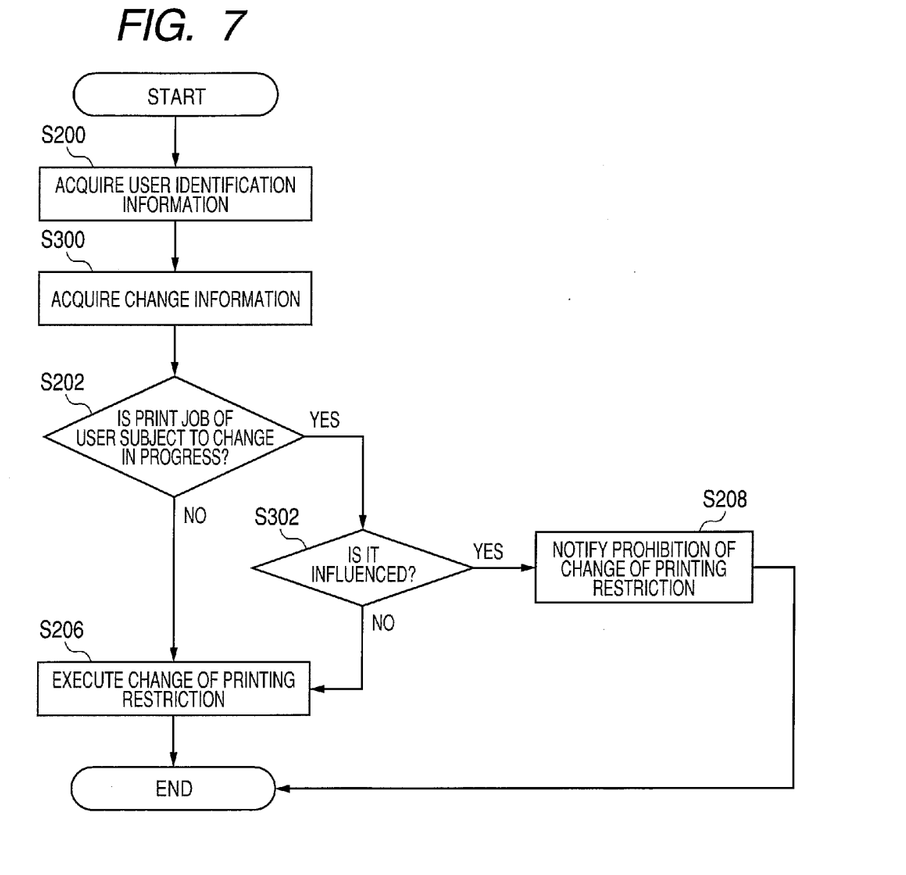
FIG. 7 is a flowchart showing a printing restriction change process according to a second exemplary embodiment of the invention.

Referring to FIG. 7, a second exemplary embodiment will be described. A difference from the first exemplary embodiment exists in the content of the process of the change of printing restriction. All the other points are the same as in the first exemplary embodiment. Therefore, components that are the same as those in the first exemplary embodiment are given the same reference numerals, and overlapping description thereof is omitted. A description is given of the different points.

As shown in FIG. 7, in the second exemplary embodiment, the CPU 11 of the image forming apparatus acquires the user identification information in S200. Then, the CPU 11 acquires data of change information via the communication line L (S300) if the administrator A inputs the change information of a printing restriction in the computer 5A. Then, in S202, the CPU 11 executes judgment of job process state in accordance with FIG. 4. Here, if the change of printing restriction is permitted (S202: NO), the change information of a printing restriction is changed to the change information acquired in S300 (S206).

If the change of printing restriction is not permitted (S202: YES), the CPU 11 executes influence judgment in S302. In S302, it is judged whether the change information acquired in S300 influences the print processing of a print job in progress. At this time, the CPU 11 functions as an influence judging unit.

Here, the change information includes content to loosen the printing restriction and content to tighten the printing restriction. The content to loosen the printing restriction includes, for example, change of print availability from "not available" to "available," change of color printing availability from "not available" to "available," or an increase in the upper limit in the printable number of sheets. In contrast, the content to tighten the printing restriction includes opposite content to loosen the printing restriction.

In the second exemplary embodiment, when the change information includes the content to loosen the printing restriction, it is judged that the change information does not influence the print processing (S302: NO), and the change of printing restriction is permitted. Then, the process goes to S206. In contrast, when the change information includes the content to tighten the printing restriction, it is judged that the change information influences the print processing (S302: YES), the change of printing restriction is prohibited, and the process goes to S208. Incidentally, even if the change information includes the content to tighten the printing restriction, it is judged that the change information does not influence the print processing (S302: NO) so long as the print processing is not substantially influenced. For example, even if the change information includes the content of reducing the upper limit in the printable number of sheets, it is judged that the change information does not influence the print processing so long as the print job in progress of print processing can be printed in full pages. Further, even if the change information includes the content of changing from color printing permission to color printing non-permission, it is judged that the change information does not influence the print processing unless the printing data corresponding to the print job in progress of print processing is monochrome image data.

According to the second exemplary embodiment, even if there exists the print job in progress of print processing, the change of printing restriction is permitted so long as the change information of a printing restriction based on a change request does not influence a print job in progress of print processing. Therefore, if there exists a print job in progress of print processing, the permissible range of change of printing restriction can be further widened than in a configuration in which the change of printing restriction is uniformly prohibited regardless of the change information.

Further, where the change information has the content to loosen the printing restriction, it is judged that the change information does not influence the print processing, and the change of printing restriction is permitted. Therefore, the permissible range of change of printing restriction can be further widened than in a configuration in which change of printing restriction is uniformly prohibited regardless of whether the change information includes the content to loosen or tighten the printing restriction.

(Other Exemplary Embodiments)

The invention is not limited to the above-described exemplary embodiments described in the specification and the drawings. For example, the following various types of modes are included in the technical scope of the invention. In particular, components other than the components of the uppermost-ranked invention, among the components of the respective exemplary embodiments, are additional elements, and may be appropriately omitted.

In the above-described exemplary embodiments, the image forming apparatus 3 is a multi-function device including a printer function, a copying function, and a facsimile function, etc. However, the image forming apparatus 3 is not limited thereto. Alternatively, the image forming apparatus 3 may be configured to include at least one of these functions. Further, any one of electro-photographic system and an ink-jet system may be adopted for the image forming apparatus 3.

In the above-described exemplary embodiments, print jobs based on a PC printing request, a copying request and receipt of facsimile transmission are registered in a waiting matrix (queue). Alternatively, if an image forming apparatus has a so-called configuration capable of executing direct printing, which directly reads image data in a peripheral memory (for example, USB memory) detachably mounted therein, the print job may be registered in the waiting matrix (queue) based on loading of the image data from the peripheral memory.

In the above-described exemplary embodiments, it is judged whether a "print job in progress of print processing" exists in judgment of the job processing state. Alternatively, in addition to the print job in progress of print processing, it may be judged whether a "print job registered in the waiting matrix (queue)" exists. In this case, the print job in progress of print processing and a print job waiting for print processing, which is requested for printing and registered in the waiting matrix (queue) are included in the "print job in progress of print processing" referred to in the invention. In this case, it may be configured that the process for prohibiting the print processing in S204 is provided between S200 and S202 in FIG. 4. According thereto, it can be judged in detail, based on respective print jobs actually in progress of print processing, whether the change of printing restriction is to be permitted.

Further, in judgment of print processing state (S202 in FIG. 4 and FIG. 7), where it is judged that a print job in progress of print processing exists, such a configuration may be adopted in which it is uniformly judged that the change of printing restriction is prohibited without judging whether a user of the print job is coincident with the user subject to change.

In the above-described exemplary embodiments, the setting information of a printing restriction is stored per user. Alternatively, the setting information of a printing restriction may be stored per group consisting of a plurality of users, and the printing restriction may be set and changed group by group.

In the above-described exemplary embodiments, the image forming apparatus 3 executes job administration based on a waiting matrix, detection process, judgment of job processing state, and the first permitting process. Alternatively, all or apart of the job administration, detection process, judgment of job processing state, and the first permitting process may be executed at the host computer 5A side, for example, where the computer 5A of the administrator A is the host computer, the computers 5B, 5C, of the other users are client computers, and data communications between the corresponding client computers and the image forming apparatus 3 are executed via the host computer 5A.

Alternatively, at least judgment of the job processing state and the first permitting process, etc., may be executed at the computer 5A side. In this case, when the setting information of a printing restriction is stored, for example, in the hard disk 37 of the computer 5A, the corresponding setting information is acquired from the hard disk 37, and when the setting information is stored in the NVRAM 17 of the image forming apparatus 3, the corresponding setting information is acquired from the NVRAM 17 via the communication line L. Further, the current job processing state will be acquired from the image forming apparatus 3 via the communication line L. Such a configuration can relieve the processing load at the image forming apparatus 3.

With respect to the process of change of printing restriction in the first exemplary embodiment, the processes of S210 through S228 in FIG. 4 may be deleted so as to finish the process of change of printing restriction at S208. Alternatively, it may be configured that, even if the user of a print job in progress of print processing is coincident with the user subject to change, the change of printing restriction is permitted so long as the change information does not influence the print process. That is, such a configuration may be adopted, in which the processes of S300 and S302 in FIG. 7 are executed after "NO" is judged in S202 in FIG. 4, the process goes to S206 where "YES" is judged in S302, and goes to S208 where "NO" is judged in S302. In this case, S216 and S222 may be omitted in FIG. 4.

In the second exemplary embodiment, the change of printing restriction is permitted when the change information includes the content to tighten the printing restriction. Alternatively, such a configuration may be adopted in which the change information has the content of enabling continuance of the current print processing even if the change information includes the content to tighten the printing restriction, the change of printing restriction is permitted. For example, if the print processing in progress is monochrome printing process, the change of printing restriction is permitted even when the color printing availability is changed from "available" to "not available."

Incidentally, in the second exemplary embodiment, when the change information includes the content to delete or change the user identification information of a user subject to change, it is preferable that the change of printing restriction is prohibited as non-permission of printing continuance. Further, if the items subject to restriction include setting of the resolution, it may be preferable to prohibit the change of printing restriction as the content to tighten the printing restriction when the resolution is reduced.

Figure 8:
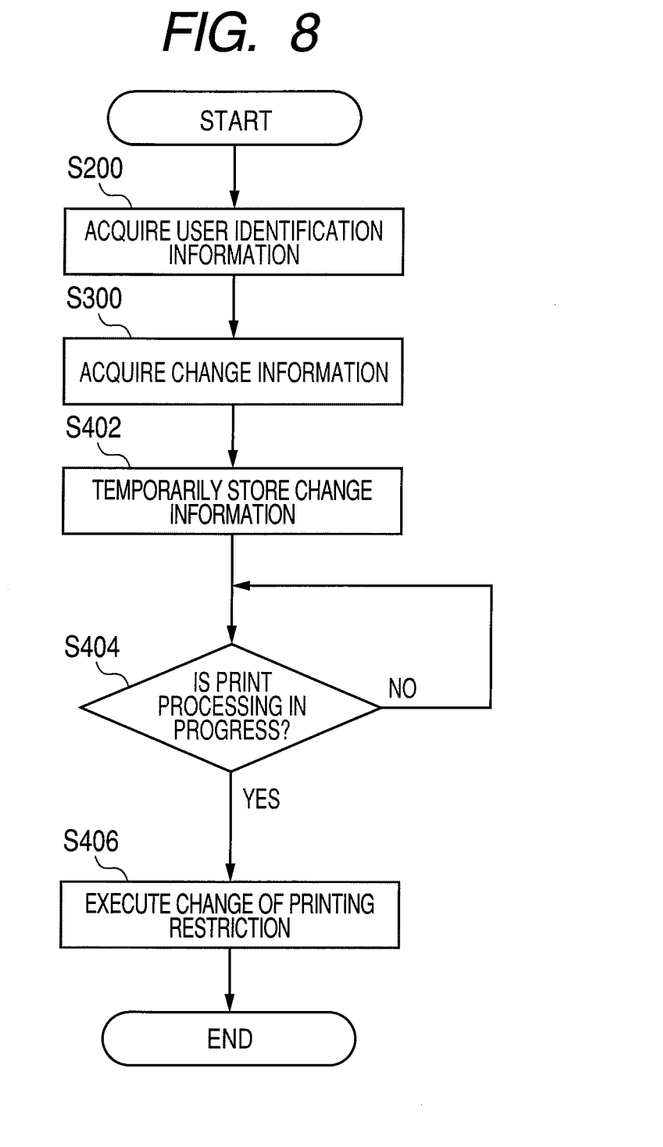
FIG. 8 is a flowchart showing a printing restriction change process according to a modified version.

Alternatively, a process of change of printing restriction as shown in FIG. 8 may be accepted. That is, such a configuration may be adopted in which, after the user identification information and change information are acquired in S200 and S300, the change of printing restriction is executed (S406) when the print processing of a print job in progress is finished (S404: YES) with the change information temporarily stored in S402. According thereto, whoever a user subject to change is, the change of printing restriction will be executed after the print processing in progress is finished.

According to another aspect of the invention, in the image forming system, wherein the first memory unit stores setting information corresponding to a plurality of users, respectively, wherein the image forming system further comprises: a user judging unit that judges whether a user of a print job in processing matches a user corresponding to the setting information subject to the change request, and wherein, when the user judging unit judges that the users do not match with each other even when the job judging unit judges that there exists a print job in progress of processing, the first permitting unit permits the change of the setting information.

According thereto, even when there is a print job in progress of processing, change of the setting information is permitted if a user of the print job in progress of processing is not coincident with a user corresponding to the setting information subject to a change request. Therefore, if there exists a print job in progress of processing, the permissible range of change of the setting information can be further widened than in the configuration of uniformly prohibiting change of the setting information regardless of the user.

According to still another aspect of the invention, the image forming system further comprises: an influence judging unit that judges whether content of change information for changing the setting information in accordance with the change request influences the print processing of the print job in processing, wherein, when the influence judging unit judges that the change information does not influence the print processing of the print job in processing even when the job judging unit judges that there exists a print job in progress of processing, the first permitting unit permits the change of the setting information.

According thereto, if the content of change information to change the setting information of a printing restriction by a change request does not influence print processing of a print job in progress of processing even when there exists the print job during processing, change of the setting information is permitted. Therefore, the permissible range to change the setting information can be further widened than in the configuration of uniformly prohibiting change of the setting information regardless of the change information if there exists a print job in progress of processing.

According to still another aspect of the invention, in the image forming system, wherein the influence judging unit judges that the change information does not influence the print processing when the content of the change information loosens the printing restriction.

According thereto, change of the setting information is permitted by judging that print processing is not influenced if the content of the change information loosens the printing restriction. Therefore, in comparison with the configuration of uniformly prohibiting change of the setting information regardless of whether the content of change information loosens or tightens the printing restriction, the permissible range to change the setting information can be further widened.

According to still another aspect of the invention, the image forming system further comprises: a second memory unit that stores change information for changing the setting information in accordance with the change request; and a change unit that changes the setting information based on the change information stored in the second memory unit, wherein the first permitting unit prohibits the change of the setting information when there is a non-permitting reason for change of the setting information, and wherein the change unit changes the setting information when the non-permitting reason in the first permitting unit is removed.

According thereto, if change information is stored in the second memory unit even if change of the setting information is prohibited when requesting the change, it is possible to automatically change the setting information based on the corresponding change information when a non-permitting reason of change of the setting information is thereafter eliminated.

According to still another aspect of the invention, the image forming system further comprises: a selection unit that selects one of reservation mode and instantaneous mode; a second permitting unit that forcibly permits the change of the setting information when the first permitting unit does not permit the change of the setting information; and a controller that is operable to: allow the change unit to change the setting information when the reservation mode is selected; and allow the second permitting unit to permit the change of the setting information when the instantaneous mode is selected.

According thereto, when change of the setting information is not permitted at the first permitting unit, it is possible to select that change of the corresponding setting information is instantaneously executed or that the change is suspended until a non-permitting reason is eliminated at the first permitting unit.

According to still another aspect of the invention, the image forming system further comprises: a prohibition unit that prohibits the print processing of the printing unit.

According thereto, since print processing is prevented during change work made by an administrator, etc., it is possible for the administrator to execute the change work with sufficient time.

According to still another aspect of the invention, in the image forming system, wherein the print job in processing is a print job in progress of the print processing by the printing unit.

According thereto, since it is judged based on respective print jobs being actually subjected to print processing whether change of the setting information should be permitted, the permissible range of change of the setting information can be widened.

According to still another aspect of the invention, in the image forming system, wherein the printing unit executes a printing process of a plurality of print jobs, and wherein the image forming system further comprises: an elimination unit that eliminates at least one print job, which is restricted from being printed by the printing restriction, from the plurality of print jobs.

According thereto, since a print job whose print processing is not permitted by a printing restriction is removed from the objects to be processed, it is possible to smoothly proceed with print processing of another print job coming after the corresponding print job.

What is claimed is:

1. A non-transitory computer readable medium storing computer readable instructions that, when executed by a processor, cause an apparatus to:
detect a request to change a limit on a number of pages allowed to be printed by an image forming apparatus, wherein the request is specific to an entity and includes an identifier corresponding to the entity;
determining that print processing for a first print job is being executed by the image forming apparatus and that a second print job has already been queued when the request is detected;
store the request in a manner such that a change to the limit on the number of pages allowed to be printed based on the request is implemented without requiring further user input;
determine whether the print processing for the first print job has been completed; and
after determining that the print processing for the first print job has been completed and before beginning print processing for the second print job, change the limit on the number of pages allowed to be printed in accordance with the request.

2. The computer readable medium of claim 1, wherein the request to change the limit on the number of pages is a request to decrease the limit on the number of pages allowed to be printed.

3. The computer readable medium of claim 1, wherein the apparatus is further caused to:
prior to detecting the request to change the limit on the number of pages allowed to be printed by the image forming apparatus:
detect a request to perform the first print job;
detect a request to perform the second print job; and
queue the second print job; and
after changing the limit on the number of pages allowed to be printed, perform the print processing of the second print job.

4. The computer readable medium of claim 1, wherein, when no print processing is being executed by the image forming apparatus when the request is detected, determining that a time at which to change the limit on the number of pages allowed to be printed is a current time.

5. The computer readable medium of claim 1, wherein the entity is a user.

6. The computer readable medium of claim 1, wherein the apparatus includes the image forming apparatus.

7. An image forming apparatus comprising:
a processor;
memory storing instructions and configured to store a limit on a number of pages allowed to be printed; and
a printing device configured to execute print processing of a first print job and a second print job,
wherein the instructions, when executed by the processor, cause the image forming apparatus to:
detect a request to change the limit on the number of pages allowed to be printed by the image forming apparatus, wherein the request is specific to an entity and includes an identifier corresponding to the entity;
determine that print processing for the first print job is being executed and that the second print job has already been queued by the image forming apparatus when the request is detected;
store the request in a manner such that a change to the limit on the number of pages allowed to be printed based on the request is implemented without requiring further user input;
determine whether the print processing for the first print job has been completed; and
after determining that the print processing for the first print job has been completed and before beginning print processing for the second print job, change the limit on the number of pages allowed to be printed in accordance with the request.

8. The image forming apparatus of claim 7, wherein detecting the request to change the limit on the number of pages allowed to be printed includes receiving the request from an information processing apparatus separate from the image forming apparatus.

9. The image forming apparatus of claim 7,
wherein the request to change the limit on the number of pages is a request to decrease the limit on the number of pages allowed to be printed.

10. The image forming apparatus of claim 7, wherein the image forming apparatus is further caused to:
prior to detecting the request to change the limit on the number of pages allowed to be printed by the image forming apparatus:
detect a request to perform the first print job;
detect a request to perform the second print job; and
queue the second print job; and
after changing the limit on the number of pages allowed to be printed, perform the print processing of the second print job.

11. The image forming apparatus of claim 7, wherein, when no print processing is being executed by the printing device when the request is detected, determining that a time at which to change the limit on the number of pages allowed to be printed is a current time.

12. The image forming apparatus of claim 7, wherein the entity includes a user.

13. A method comprising:
detecting, by a computing device, a request to change a limit on a number of pages allowed to be printed by an image forming apparatus, wherein the request is specific to an entity and includes an identifier corresponding to the entity;
determining, by the computing device, whether print processing for a first print job is being executed and that a second print job has already been queued by the image forming apparatus when the request is detected;
storing the request in a manner such that a change to the limit on the number of pages allowed to be printed based on the request is implemented without requiring further user input;
determining whether the print processing for the first print job has been completed; and
after determining that the print processing for the first print job has been completed and before beginning print processing for the second print job, changing the limit on the number of pages allowed to be printed in accordance with the request.

14. The method of claim 13, wherein the computing device includes the image forming apparatus.

15. The method of claim 13, wherein detecting the request to change the limit on the number of pages allowed to be printed includes receiving the request from an information processing apparatus separate from the image forming apparatus.

16. The method of claim 13,
wherein the request to change the limit on the number of pages is a request to decrease the limit on the number of pages allowed to be printed.

17. The method of claim 13, further comprising:
prior to detecting the request to change the limit on the number of pages allowed to be printed by the image forming apparatus:
detect a request to perform the first print job;
detect a request to perform the second print job; and
queue the second print job; and
after changing the limit on the number of pages allowed to be printed, perform the print processing of the second print job.

18. The method of claim 13, wherein, when no print processing is being executed by the image forming apparatus when the request is detected, determining that a time at which to change the limit on the number of pages allowed to be printed is a current time.

19. The method of claim 13, wherein the entity includes a user.

* * * * *